United States Patent [19]

Hong

[11] Patent Number: 5,243,476
[45] Date of Patent: Sep. 7, 1993

[54] METHOD OF ESTABLISHING THE COPYING SPEED OF A DOUBLE-DECK VCR

[75] Inventor: Kuen Pyo Hong, Suweon, Rep. of Korea

[73] Assignee: Samsung Electronics Co., Ltd., Rep. of Korea

[21] Appl. No.: 808,579

[22] Filed: Dec. 17, 1991

[30] Foreign Application Priority Data

Apr. 13, 1991 [KR] Rep. of Korea .................. 91-6011

[51] Int. Cl.⁵ .............................................. G11B 15/46
[52] U.S. Cl. ..................................... 360/73.02; 360/15
[58] Field of Search ............ 360/15, 73.02, 14.1, 360/13, 73.04, 73.05; 369/84; 358/311, 335

[56] References Cited

U.S. PATENT DOCUMENTS

| 4,261,020 | 4/1981 | Beeson et al. | 360/73.02 |
| 5,103,348 | 4/1992 | Sasho et al. | 360/14.1 |
| 5,124,807 | 6/1992 | Dunlap et al. | 360/15 X |

FOREIGN PATENT DOCUMENTS 2747449  4/1978  Fed. Rep. of Germany ... 360/73.02

*Primary Examiner*—Andrew L. Sniezek
*Attorney, Agent, or Firm*—Sughrue, Mion, Zinn, Macpeak & Seas

[57] ABSTRACT

A method for controlling a double-deck VCR during a tape duplication operation includes the steps of sensing the recording speed of a tape in an A deck, determining if an input signal for establishing a recording speed to be used by a B deck during the copying operations is provided, and transmitting the established recording speed to the B deck. When an input for establishing the recording speed is not provided, the recording speed of the tape in the A deck is selected as the established recording speed and is transmitted to the B deck. The sensing step includes the step of displaying using OSD (on-screen-display) characters displayed on a display device, the recording speed of the tape in the A deck. The determining step includes to step of displaying the established recording speed using corresponding OSD (on-screen-display) characters on the display device. Thus, the method according to present invention prevents an undesirable influence on the quality of the tape copy produced in the B deck due to the difference between the playback speed and the recording speed during copying operations performed by the double-deck VCR.

2 Claims, 3 Drawing Sheets

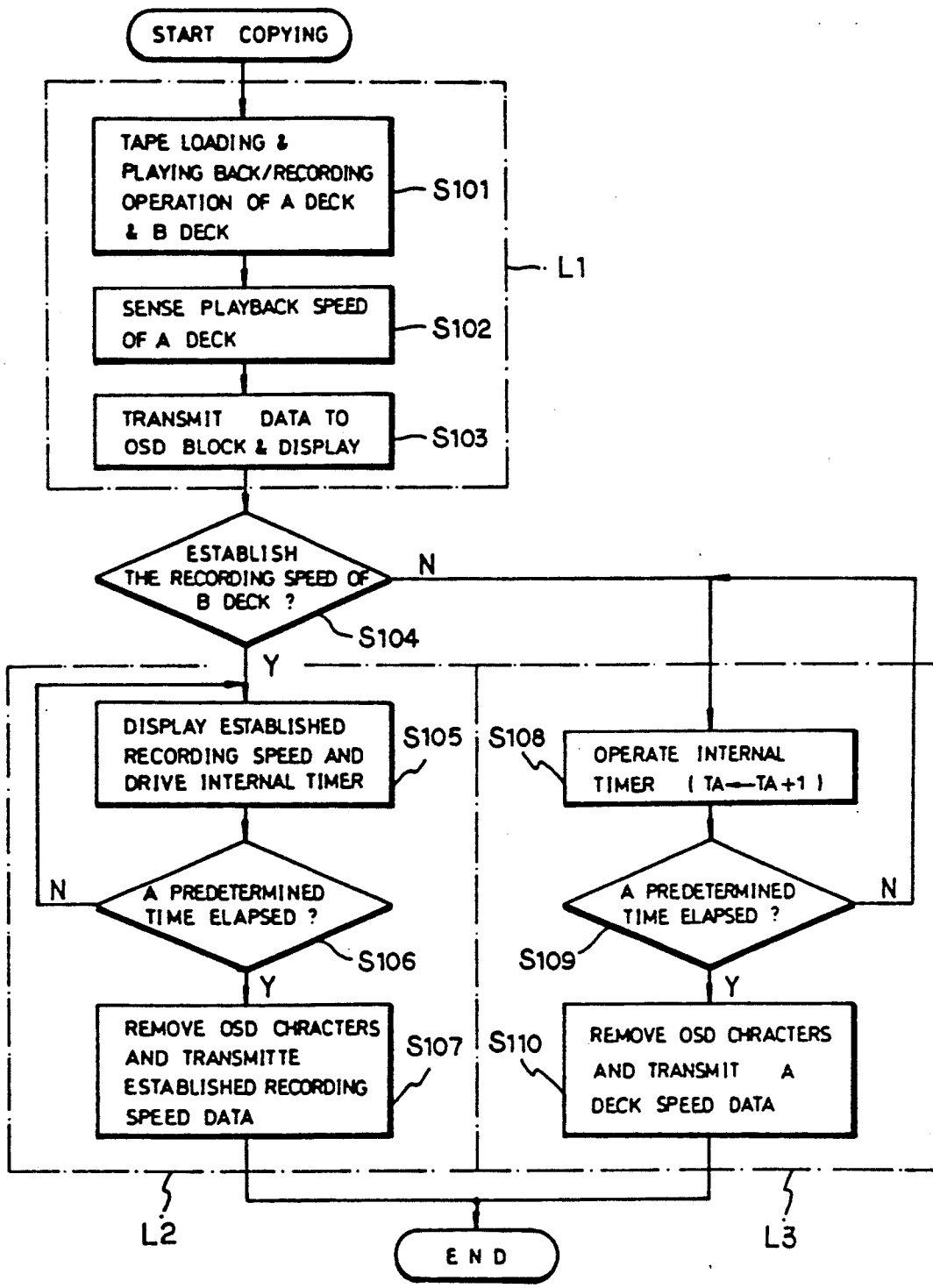

FIG. 3A
FIG. 3B 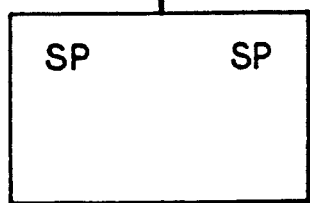 FIG. 3C 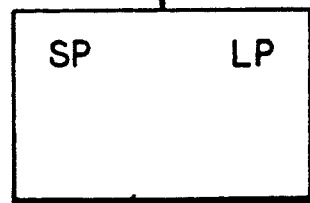

FIG. 4A
PRIOR ART
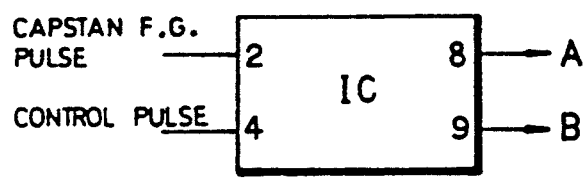
FIG. 4B
|     | A | B |
|-----|---|---|
| SP  | L | L |
| LP  | H | L |
| SLP | L | H |

METHOD OF ESTABLISHING THE COPYING SPEED OF A DOUBLE-DECK VCR

BACKGROUND OF THE INVENTION

The present invention relates to a double-deck VCR, and more particularly to, the method for establishing the copying speed of a VCR by detecting the speed at which a first tape was recorded by a playback deck during the copying operation, thereby automatically establishing the recording speed of the other tape in the recording deck.

Conventionally, the double-deck VCR includes two decks of which one (A deck) is played back, and the other (B deck) is recorded so as to conveniently duplicate the tape using the VCR. However, it also has a shortcoming that the recording speed can be incorrectly set up or not during the copying operation under a user's choice.

That is, the tape in the A deck is played back at a speed, which is chosen from among three options, i.e. SP (Standard Play), LP (Long Play), and SLP (Super Long Play) so that it can be copied to a tape in the B deck by establishing the recording speed of the B deck.

However, when the user incorrectly establishes the recording speed in the tape of B deck or forgets to set it, the copying operation by the double-deck VCR has an adverse effect on the quality of a recorded image.

SUMMARY OF THE INVENTION

In order to overcome the above problems, it is an object of the present invention to provide a method for establishing the copying speed of a double-deck VCR. The method can be performed by sensing the speed at which a tape is recorded on an A deck and intermittently displaying a playback speed on a screen during a predetermined time, and thereafter, when an input for establishing the recording speed of a B deck is provided, the recording speed of the B deck can be set to the established speed, while the recording speed of the B deck is automatically set to be the same speed sensed by the A deck when there is no input.

In order to achieve the object, there is provided a method for establishing the copying speed of the double-deck VCR comprising a microcomputer for controlling the driving and servo elements of the A deck and B deck and an on-screen-display (hereinafter, termed OSD) for displaying characters through an OSD block. The method includes a displaying routine for sensing a playback speed in the A deck and intermittently displaying it on the screen by the OSD characters, a discriminating step for checking an input for establishing the recording speed in the B deck during a predetermined time checked by an internal timer after displaying the playback speed, a speed establishing routine for displaying the recording speed established in the B deck by the OSD characters input during a predetermined time and for transmitting speed data established to the B deck, and an automatic speed establishing routine for transmitting the same recording speed data as the playback speed of the tape in A deck to the B deck when there is no input during the predetermined time.

BRIEF DESCRIPTION OF THE DRAWINGS

FIG. 2 is a flow chart showing a method for establishing the copying speed of a double-deck VCR according to the present invention.

FIGS. 3A~3D are diagrams for explaining the display of recording speeds according to this invention.

FIG. 4A is a block diagram of a playback speed detecting circuit; and

FIG. 4B is a tabular illustration of the output states of the circuit element of FIG. 4A according to the present invention.

DETAILED DESCRIPTION OF THE INVENTION

Figure 1:
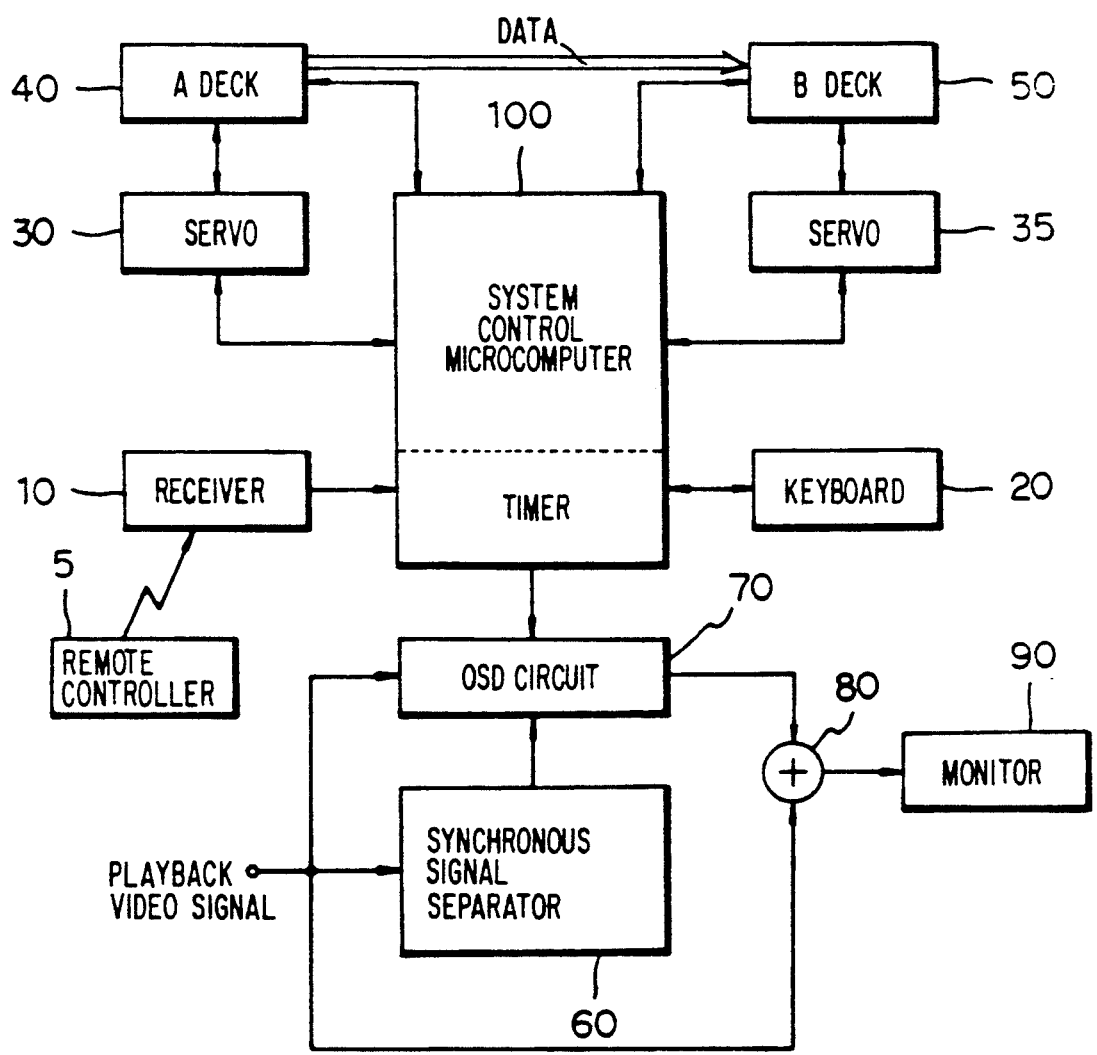
FIG. 1 is a block diagram of a double-deck VCR according to the present invention.

FIG. 1 is a block diagram of a double-deck VCR according to the present invention, comprising a receiver 10 for receiving signals from a remote controller 5, a microcomputer 100 connected to a keyboard 20 for inputting characters and numbers and to receiver 10 for controlling the operation of the double-deck VCR in accordance with the signals from the receiver 10 and the input of the keyboard 20. Two decks, an A deck 40 and a B deck 50 are connected to the microcomputer 100 by control lines and to each other by data lines for recording. Servos 30, 35, for controlling the driving of A deck 40 and B deck 50 during recording are also connected to microcomputer 100. A synchronous signal separator 60 is connected to a playback video signal input terminal connected to A deck by a data line (not shown) for separating synchronous signals from an input playback video signal, an OSD circuit 70 connected to the playback video signal line, the synchronous signal separator 60, and the microcomputer 100 for converting character signals received from the microcomputer 100 into video signals, a mixer 80 connected to the OSD circuit 70 and the playback video signal line for mixing the video signals from the OS circuit 70 with the playback video signals, and a monitor 90 connected to the mixer 80 for displaying the OSD characters superimposed on the playback video signals.

It should be noted that the microcomputer 100 is jointly used as a single microcomputer, while the servos 30, 35 are separately installed into each deck.

FIG. 2 is a flow chart illustrating the method for establishing the copying speed of the double-deck VCR according to the present invention invention, including a displaying routine L1, a speed establishing routine L2, and an automatic speed establishing routine L3.

The displaying routine L1 for displaying the OSD characters on monitor 90 by sensing the playback speed of the A deck 40 during the copying operation includes a step S101 for carrying out the playback and recording operation after loading the tapes in the A deck 40 and B deck 50 when a copy signal is received from either keyboard 20 or receiver 10, a step S102 for sensing the playback speed of the A deck 40, and a step S103 for applying the sensed playback speed to the OSD circuit 70 in corresponding characters and thereby displaying playback speed on monitor 90, and a discriminating step S104 for checking whether an input for establishing the recording speed of the B deck 50 is provided or not by the operator.

The speed establishing routine L2 for transmitting the established speed data to the B deck 50 when the speed establishing input is provided includes a step S105 for displaying the established recording speed on the monitor 90 by the OSD characters and for operating an internal timer, which advantageously is included within microcomputer 100, a step S106 for checking whether a predetermined time has elapsed or not, a step S107 for removing the OSD characters displayed on the monitor 90 after a predetermined time has elapsed and for transmitting the established recording speed data to B deck. At this time, if the predetermined time didn't elapse yet, the program returns from the step S106 to the step S105 to operate the internal timer until the predetermined time has completely elapsed.

Meanwhile, the automatic speed establishing routine L3 for transmitting the same recording speed data as the playback speed when no input for establishing the recording speed of the B deck has been separately provided includes a step S108 for operating the internal timer during a second predetermined time period, a step S109 for checking the predetermined time while displaying the playback speed, and a step S110 for transmitting the same recording speed of A deck data as the playback speed to the servo 35 after the second predetermined time has elapsed.

Figure 3D:
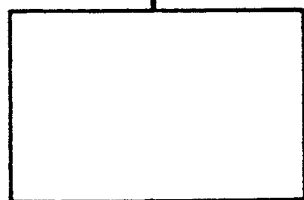

FIGS. 3A~3D are diagrams showing display of the monitoring speeds according to the present invention, where FIG. 3 shows that the speed of the playback tape in the A deck 40 is intermittently displayed, and FIG. 3B shows that the same recording speed as the playback speed is displayed, FIG. 3C shows that the established recording speed is displayed together with the playback speed, and FIG. 3D shows that the recording speed data is transmitted to the servo 35 for performing the copying operation.

FIG. 4A shows a schematic block diagram of a speed detecting integrated circuit (IC) for sensing the playback speed. Preferably, the IC is an AN6354 chip made by Matsushita Corporation in Japan. FIG. 4B shows the output states of the IC.

Now, the operation of the device according to the present invention will be described in more detail.

The microcomputer 100 receives a remote control signal from the remote controller 5 via the receiver 10 or a key input from the keyboard 20.

Then, the microcomputer 100 transmits data to the servo 30 for the A deck 40 i.e., the playback deck, and the servo 35 for the B deck 50 i.e., the recording deck, in order to control the decks.

Also, the microcomputer 100 transmits the character data to the OSD circuit 70 to display these characters on the monitor 90. At that time, the OSD circuit 70 converts the character signals from the microcomputer 100 to the video signals by receiving a synchronous signal separated from the synchronous signal separator 60. The video signal of the OSD circuit 70 is mixed with the video signal played back in the A deck 40 by a mixer 80, so that the former is displayed on the monitor 90, superimposed on the latter.

As described above, the internal configuration of the double-deck VCR in which the microcomputer 100 controls the driving of the A deck 40 and B deck 50 and operates the OSD characters can be modified by internal programming so as to automatically establish the copying speed. Also, sensing of the playback speed is achieved by the speed detecting output detected by integrated circuit IC (IC1) such as AN6354, shown in FIG. 4A, which advantageously is included in A deck 40. The IC (IC1) recognizes the playback speed by checking the F.G. pulse of a capstan motor and a control pulse and by applying the speed detecting output to the microcomputer 100. That is, the speed detecting IC (IC1) applies the F.G. pulse of the capstan motor depending on the speed (SP=720 Hz, LP=360 Hz, and SLP=240 Hz) of the capstan motor, while the control pulse has a constant frequency of 30 Hz. Thus, the recorded speed on the tape can be sensed from among SP, LP, and SLP by counting the F.G. pulse with the control pulse.

In this case, it is a well-known technique by which the IC applies the F.G. pulse of the capstan motor and the control pulse and applies the output of the IC according to the recording speed of the tape to the microcomputer 100.

Also, because the frequency of the F.G. pulse varies in proportion to the rotating speed of the capstan motor, the recording speed is either controlled to an established value by changing the driving voltage of the capstan motor in recording or forms the driving control voltage of the capstan motor after sensing the F.G. pulse of the capstan motor and comparing it with the control pulse.

The microcomputer 100 detects the playback speed according to the output of the speed detecting IC and controls the capstan motor according to the established recording speed in accordance with the flow chart illustrated in FIG. 2.

First, if the copying operation starts by the copy signal input from the remote controller 5 or from the keyboard 20, the microcomputer 100 controls and loads two tapes into the A deck 40 and the B deck 50, respectively, and operates the tape in the A deck in the playback mode and that in the B deck 50 in the recording mode by the step S101 in the displaying routing L1.

Then, the microcomputer 100 recognizes the playback speed of the tape played back in the A deck 40 by the step S101 in the displaying routine L1 by receiving the output detected from the IC(IC1) shown in FIG. 4. During the step S103 the microcomputer 100 transmits the detected playback speed to the OSD circuit 70 in character data and the OSD circuit 70 applying a signal provided from the synchronous signal separator 60 generates the video signal from the character data. Next, the video signal of the OSD circuit 70 is superimposed on the video signal produced in the A deck.

Thus, the playback speed of the A deck 40 is displayed on the monitor 90.

The playback speed of the A deck 40 is intermittently displayed, as shown in FIG. 3A, and thereafter, during the step S104, the existence of an input for establishing the recording speed in the B deck is checked.

In this case, if the recording speed is established by the remote controller 5 or keyboard 20 in the step S104, the recording speed determined by the step S105 in the speed establishing routine L2, as shown in FIG. 3C is displayed on the monitor 90 in the form of the OSD characters, and operation of the internal timer starts. On the other hand, during the step S106 in the speed establishing routine L2, the microcomputer 100 checks whether a predetermined time has elapsed or not, and by the step S107 in the speed establishing routine L2 the microcomputer 100 removes the displayed OSD characters again and simultaneously transmits the established recording speed data to the servo 35, so that the B deck 50 is recorded at a established speed as shown in FIG. 3D.

It will be appreciated that the reason the recording speed is displayed until the predetermined time has elapsed for giving the user a chance to confirm that the recording speed is identical to the playback speed.

Meanwhile, as shown in FIG. 3A, the playback speed is intermittently displayed, and thereafter, in case of no input for establishing the recording speed in the B deck by the step S104, the timer is operated by the step S108 in the automatic speed establishing route L3. After checking whether the predetermined time has elapsed or not by the step S109, if no input for establishing of the recording speed in the B deck 50 is provided during the predetermined time, the speed of the B deck 50 is automatically set equal to that of the A deck 40 by the step S110 in the routine L3.

In this manner, if there is no input for determining the recording speed during the constant time (about 2 to 3 seconds) checked by the internal timer after displaying the playback speed, the recording speed is displayed; which is equal to the playback speed, on the monitor 90, as shown in FIG. 3B, and then the OSD characters disappear. At the same time, the recording speed data equal to the playback speed is transmitted to the servo 35, thereby the B deck 50 performs the recording operation at a speed equal to that of the A deck 40.

Therefore, according to the present invention, the playback speed of the A deck of the double-deck VCR is detected and intermittently displayed in the form of the OSD characters. Thereafter, when the recording speed in the B deck is established within a predetermined time, the established recording speed data is transmitted to the servo of the B deck. And then, the playback speed of the B deck is recorded at the same speed as the A deck.

As described hereinabove, the present invention prevents an undesirable influence on the quality of an image which occurs when the recording speed of the B deck is incorrectly established or omitted in the copying operation performed by the double-deck VCR.

What is claimed is:

1. A method for establishing the copying speed of a double-deck VCR including a microcomputer for controlling the driving of servos of an A deck and a B deck and an on-screen display means for displaying characters, said method comprising the steps of:

sensing a playback speed in said A deck and intermittently displaying said playback speed as corresponding OSD characters on said display means;

checking for an input signal for establishing a recording speed in said B deck within a predetermined time, when the input for establishing said recording speed is provided during said predetermined time, displaying the established recording speed in said B deck by said OSD characters;

transmitting the established speed data to said B deck; and when no input for establishing said recording speed data is provided, transmitting the same recording speed data as said playback speed in said A deck to said B deck.

2. A method for controlling the double-deck VCR including first and second tape decks and first and second servos, respectively, said first tape deck coupled to a means of displaying OSD characters and said first and second tape decks being connected to a microprocessor operated in response to signals received from one of a keyboard and a means for remote control, said method comprising the steps of:

sensing a playback speed of said first tape deck and intermittently displaying said playback speed as corresponding first OSD characters on said means for displaying OSD characters;

checking for an input signal from said one of the keyboard and the means for remote control corresponding to an established recording speed for said second tape deck;

when said input signal is provided:

displaying the established recording speed as second OSD characters on said means for displaying OSD characters; and transmitting data corresponding to said established sped to said second tape deck after a first predetermined time period has elapsed; and when no said input signal is provided, transmitting data corresponding to said playback speed to said second tape deck after a second predetermined time period has elapsed.

* * * * *